United States Patent
Aikawa et al.

(10) Patent No.: US 9,507,881 B2
(45) Date of Patent: Nov. 29, 2016

(54) SEARCH DEVICE

(75) Inventors: Takeyuki Aikawa, Tokyo (JP); Yohei Okato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 163 days.

(21) Appl. No.: 14/344,008

(22) PCT Filed: Dec. 27, 2011

(86) PCT No.: PCT/JP2011/007312
§ 371 (c)(1),
(2), (4) Date: Mar. 10, 2014

(87) PCT Pub. No.: WO2013/098886
PCT Pub. Date: Jul. 4, 2013

(65) Prior Publication Data
US 2014/0236994 A1 Aug. 21, 2014

(51) Int. Cl.
*G06F 17/30* (2006.01)
*G01C 21/36* (2006.01)

(52) U.S. Cl.
CPC ..... *G06F 17/30985* (2013.01); *G01C 21/3611* (2013.01); *G06F 17/30029* (2013.01); *G06F 17/3053* (2013.01)

(58) Field of Classification Search
CPC ............... G06F 17/30637; G06F 17/3064; G06F 17/30672; G06F 17/30979; G06F 17/30634
USPC ................ 707/772–775, 769, 759, 749, 736
See application file for complete search history.

(56) References Cited

U.S. PATENT DOCUMENTS

| | | | | |
|---|---|---|---|---|
| 5,687,361 A | * | 11/1997 | Sarkar | G06F 17/30949 |
| 6,334,123 B1 | * | 12/2001 | Ross | G06F 17/30324 |
| 6,801,902 B1 | * | 10/2004 | David | G06F 17/30067 707/608 |
| 7,533,078 B2 | * | 5/2009 | Koskas | G06F 17/30595 |
| 7,734,615 B2 | * | 6/2010 | Anderson | G06F 17/30312 707/713 |
| 7,797,290 B2 | * | 9/2010 | Nishino | G06F 17/30321 707/641 |
| 7,831,588 B2 | | 11/2010 | Jones et al. | |
| 8,024,341 B1 | * | 9/2011 | Even-Zohar | G06F 17/30672 707/736 |

(Continued)

FOREIGN PATENT DOCUMENTS

| | | |
|---|---|---|
| CN | 101946249 A | 1/2011 |
| JP | 8-212234 | 8/1996 |

(Continued)

OTHER PUBLICATIONS

International Search Report issued Apr. 10, 2012 in PCT/JP11/07312 filed Dec. 27, 2011.

(Continued)

*Primary Examiner* — Frantz Coby
(74) *Attorney, Agent, or Firm* — Oblon, McClelland, Maier & Neustadt, L.L.P.

(57) ABSTRACT

A search unit 60 calculates a character-string similarity by acquiring expansion source document data partially matching a search query 70 from a character-string search index 40, determines a relational-data expansion similarity by acquiring expansion destination document data defined to have a relationship with the expansion source document data from a relational-data expansion index 50 and correcting the acquired data by the character-string similarity of the expansion destination document data and relation weight data 80, and outputs a search result 90 arranged in an order of the relational-data expansion similarity.

7 Claims, 15 Drawing Sheets

(56) References Cited

U.S. PATENT DOCUMENTS

| | | | | |
|---|---|---|---|---|
| 8,219,579 | B2* | 7/2012 | Ratiner | G06F 17/30637 |
| | | | | 707/769 |
| 8,392,440 | B1* | 3/2013 | Papachristou | G06F 17/3064 |
| | | | | 707/759 |
| 8,935,233 | B2* | 1/2015 | Agrawal | G06F 17/30321 |
| | | | | 707/715 |
| 2002/0169763 | A1* | 11/2002 | Tada | G06F 17/30672 |
| 2002/0180734 | A1* | 12/2002 | Endoh | G06F 3/04815 |
| | | | | 345/428 |
| 2009/0198672 | A1* | 8/2009 | Jones | G06F 17/30672 |
| 2009/0204599 | A1* | 8/2009 | Morris | G06F 17/30967 |
| 2009/0287678 | A1* | 11/2009 | Brown | G06F 17/30654 |
| 2011/0258173 | A1 | 10/2011 | Ratiner et al. | |
| 2011/0307497 | A1* | 12/2011 | Connor | G06F 17/30637 |
| | | | | 707/749 |

FOREIGN PATENT DOCUMENTS

| | | |
|---|---|---|
| JP | 2001-134588 | 5/2001 |
| JP | 2003-016103 | 1/2003 |
| JP | 2003-44515 | 2/2003 |
| JP | 2009-211683 | 9/2009 |

OTHER PUBLICATIONS

Office Action mailed Jun. 17, 2016 in Chinese Patent Application No. 201180074353.0 (with English Translation).

* cited by examiner

FIG.4

| Document ID (21) | Caption (22) | Data Type (23) |
|---|---|---|
| 1 | ABC rock band | Artist Name |
| 2 | ZYX quartet | Artist Name |
| 3 | PQR bad brothers | Artist Name |
| : | : | : |
| 10 | wild country life | Album Name |
| 20 | cold mountain | Album Name |
| 30 | bad brothers story | Album Name |
| : | : | : |
| 101 | blue belly | Song Title |
| 102 | Clear blue sky | Song Title |
| 103 | Clear blue sky | Song Title |
| 104 | Big blue sky | Song Title |
| 105 | deep blue sea | Song Title |
| 106 | deep blue sea | Song Title |
| 107 | cold mountain | Song Title |
| 108 | wild country life | Song Title |
| 109 | the river | Song Title |
| 110 | wild is the wind | Song Title |
| 111 | wild is the wind | Song Title |
| : | : | : |

FIG.5

| Expansion Source Document ID (31) | Expansion Destination Document ID (32) | Relation Type (33) |
|---|---|---|
| 1 | 10 | Artist Name → Album Name |
| 2 | 30 | Artist Name → Album Name |
| 3 | 20 | Artist Name → Album Name |
| ⋮ | ⋮ | ⋮ |
| 1 | 101 | Artist Name → Song Title |
| 1 | 102 | Artist Name → Song Title |
| 2 | 103 | Artist Name → Song Title |
| 3 | 104 | Artist Name → Song Title |
| 3 | 105 | Artist Name → Song Title |
| 1 | 106 | Artist Name → Song Title |
| 2 | 110 | Artist Name → Song Title |
| 3 | 111 | Artist Name → Song Title |
| ⋮ | ⋮ | ⋮ |
| 20 | 105 | Album Name → Song Title |
| 10 | 106 | Album Name → Song Title |
| 30 | 108 | Album Name → Song Title |
| 30 | 110 | Album Name → Song Title |
| 20 | 111 | Album Name → Song Title |
| ⋮ | ⋮ | ⋮ |

FIG.7

| Word ID | Word Character-String(Search Key) | Document ID Group |
|---|---|---|
| 1 | ABC | 1 |
| 2 | bad | 3,30 |
| 3 | band | 1 |
| 4 | belly | 101 |
| 5 | big | 104 |
| 6 | blue | 101,102,103,104,105,106 |
| 7 | brothers | 3,30 |
| 8 | clear | 102,103 |
| 9 | cold | 20,107 |
| 10 | country | 10,108 |
| 11 | deep | 105,106 |
| 12 | is | 110,111 |
| 13 | life | 10,108 |
| 14 | mountain | 20,107 |
| 15 | PQR | 3 |
| 16 | quartet | 2 |
| 17 | river | 109 |
| 18 | rock | 1 |
| 19 | sea | 105,106 |
| 20 | sky | 102,103,104 |
| 21 | story | 30 |
| 22 | the | 109,110,111 |
| 23 | wild | 10,108,110,111 |
| 24 | wind | 110,111 |
| 25 | ZYX | 2 |
| : | : | : |

FIG.8

| Word ID | Phoneme String (Search Key) | Document ID Group |
|---|---|---|
| 1 | ei | 1 |
| 2 | bi: | 1 |
| : | : | : |
| 10 | di: | 105,106 |
| : | : | : |
| 20 | p | 105,106 |
| : | : | : |

| Word ID | Partial Character-String (Search Key) | Document ID Group |
|---|---|---|
| 1 | AB | 1 |
| 2 | BC | 1 |
| : | : | : |
| 10 | de | 105,106 |
| : | : | : |
| 20 | ep | 105,106 |
| : | : | : |

| Expansion Source Document ID (Search Key) 51 | Expansion Destination Document ID 52 | Relation Type 53 |
|---|---|---|
| 1 | 10 | Artist Name → Album Name |
| 2 | 30 | Artist Name → Album Name |
| 3 | 20 | Artist Name → Album Name |
| : | : | : |
| 1 | 101 | Artist Name → Song Title |
| 1 | 102 | Artist Name → Song Title |
| 2 | 103 | Artist Name → Song Title |
| 3 | 104 | Artist Name → Song Title |
| 3 | 105 | Artist Name → Song Title |
| 1 | 106 | Artist Name → Song Title |
| 2 | 110 | Artist Name → Song Title |
| 3 | 111 | Artist Name → Song Title |
| : | : | : |
| 20 | 105 | Album Name → Song Title |
| 10 | 106 | Album Name → Song Title |
| 30 | 108 | Album Name → Song Title |
| 30 | 110 | Album Name → Song Title |
| 20 | 111 | Album Name → Song Title |
| : | : | : |

```
Start Search Processing
        ↓
Search Query Analysis         ~ST11
        ↓
Character-String
Index Search                  ~ST12
        ↓
Relational-Data Expansion
Index Search                  ~ST13
        ↓
To Output Search Result       ~ST14
        ↓
End Search Processing
```

| Document ID | Character-String Similarity |
|---|---|
| 2 | 1 |
| 101 | 1 |
| 102 | 2 |
| 103 | 2 |
| 104 | 2 |
| 105 | 1 |
| 106 | 1 |

FIG.13

| Relation Type | Relation Weight |
|---|---|
| Artist Name → Album Name | 0.3 |
| Artist Name → Song Title | 0.2 |
| Album Name → Song Title | 0.1 |

81 — Relation Type
82 — Relation Weight

FIG.14

| Document ID | Character-String Similarity | Relational-Data Expansion Similarity | |
|---|---|---|---|
| 2 | 1 | 1 | |
| 30 | 0 | 0 + 1 * 0.3 | (Artist Name → Album Name) |
| 101 | 1 | 1 | |
| 102 | 2 | 2 | |
| 103 | 2 | 2 + 1 * 0.2 | (Artist Name → Song Title) |
| 104 | 2 | 2 | |
| 105 | 1 | 1 | |
| 106 | 1 | 1 | |
| 110 | 0 | 0 + 1 * 0.2 | (Artist Name → Song Title) |

FIG.15

| Document ID | Similarity After Relational-Data Expansion | Song Title | (Artist Name) |
|---|---|---|---|
| 103 | 2.2 | clear blue sky | (ZYX quartet) |
| 102 | 2 | clear blue sky | (ABC rock band) |
| 104 | 2 | big blue sky | (PQR bad brothers) |
| 101 | 1 | blue belly | (ABC rock band) |
| 105 | 1 | deep blue sea | (PQR bad brothers) |
| 106 | 1 | deep blue sea | (ABC rock band) |
| 110 | 0.2 | wild is the wind | (ZYX quartet) |

FIG.16

| Document ID | Character-String Similarity |
|---|---|
| 10 | 2 |
| 105 | 2 |
| 106 | 2 |
| 108 | 2 |

FIG.17

| Document ID | Character-String Similarity | Relational-Data Expansion Similarity |
|---|---|---|
| 10 | 2 | 2 |
| 105 | 2 | 2 |
| 106 | 2 | 2 + 1 * 0.2 |
| 108 | 2 | 2 |

(Album Name → Song Title)

FIG.18

| Document ID | Relational-Data Expansion Similarity | Song Title (Album Name) |
|---|---|---|
| 106 | 2.2 | deep blue sea (wild country life) |
| 105 | 2 | deep blue sea (cold mountain) |
| 108 | 2 | wild country life (bad brothers story) |

FIG.19

| Document ID | Character-String Similarity |
|---|---|
| 3 | 2 |
| 10 | 1 |
| 30 | 2 |
| 108 | 1 |
| 110 | 2 |
| 111 | 2 |

FIG.20

| Document ID | Character-String Similarity | Relational-Data Expansion Similarity | |
|---|---|---|---|
| 3 | 2 | 2 | |
| 10 | 1 | 1 | |
| 20 | 0 | 0 + 2 * 0.3 | (Artist Name → Album Name) |
| 30 | 2 | 2 | |
| 104 | 0 | 0 + 2 * 0.2 | (Artist Name → Song Title) |
| 105 | 0 | 0 + 2 * 0.2 | (Artist Name → Song Title) |
| 106 | 0 | 0 + 1 * 0.1 | (Album Name → Song Title) |
| 108 | 1 | 1 + 2 * 0.1 | (Album Name → Song Title) |
| 110 | 2 | 2 + 2 * 0.1 | (Album Name → Song Title) |
| 111 | 2 | 2 + 2 * 0.2 | (Artist Name → Song Title) |

FIG.21

| Document ID | Relational-Data Expansion Similarity | Song Title | (Album Name/Artist Name) |
|---|---|---|---|
| 111 | 2.4 | wild is the wind | (cold mountain / PQR bad brothers) |
| 110 | 2.2 | wild is the wind | (bad brothers story / ZYX quartet) |
| 108 | 1.2 | wild country life | (bad brothers story / ZYX quartet) |
| 104 | 0.4 | big blue sky | (cold mountain / PQR bad brothers) |
| 105 | 0.4 | deep blue sea | (cold mountain / PQR bad brothers) |
| 106 | 0.1 | deep blue sea | (wild county life / ABC rock band) |

FIG.22

| Relation Type | Relation Weight |
|---|---|
| Artist Name → Album Name | 0.3 |
| Artist Name → Song Title | 0.1 |
| Album Name → Song Title | 0.2 |

| Document ID | Character-String Similarity | Relational-Data Expansion Similarity | |
|---|---|---|---|
| 3 | 2 | 2 | |
| 10 | 1 | 1 | |
| 20 | 0 | 0 + 2 * 0.3 | (Artist Name → Album Name) |
| 30 | 2 | 2 | |
| 104 | 0 | 0 + 2 * 0.1 | (Artist Name → Song Title) |
| 105 | 0 | 0 + 2 * 0.1 | (Artist Name → Song Title) |
| 106 | 0 | 0 + 1 * 0.2 | (Album Name → Song Title) |
| 108 | 1 | 1 + 2 * 0.2 | (Album Name → Song Title) |
| 110 | 2 | 2 + 2 * 0.2 | (Album Name → Song Title) |
| 111 | 2 | 2 + 2 * 0.1 | (Artist Name → Song Title) |

FIG.24

| Document ID | Relational-Data Expansion Similarity | Song Title | (Album Name/Artist Name) |
|---|---|---|---|
| 110 | 2.4 | wild is the wind | (bad brothers story / ZYX quartet) |
| 111 | 2.2 | wild is the wind | (cold mountain / PQR bad brothers) |
| 108 | 1.4 | wild country life | (bad brothers story / ZYX quartet) |
| 104 | 0.2 | big blue sky | (cold mountain / PQR bad brothers) |
| 105 | 0.2 | deep blue sea | (cold mountain / PQR bad brothers) |
| 106 | 0.2 | deep blue sea | (wild county life / ABC rock band) |

SEARCH DEVICE

TECHNICAL FIELD

The present invention relates to a search device that makes a fuzzy search on an index using a part of a search query as a search key.

BACKGROUND ART

When making a search for a song title, a facility name, or the like, a user does not always remember its exact name, and thus in some cases, the user makes the search using a popular name, an abbreviated name, a vaguely and improperly remembered name or the like as a search key. Meanwhile, with respect to a terminal and a device such as a car navigation apparatus and a smartphone not provided with a keyboard as an input device, there may also be a case where the search is made using as the search key a result from voice recognition of a voice signal through a microphone, a result from character recognition of an input through a touch panel, or the like. In either case, a technique is required to make a fuzzy (ambiguous) search for not only a proper name, but also its analogous name in pronunciation or character-string.

An example of a conventional search technique that enables the fuzzy search as mentioned above is proposed in Patent Document 1. An invention according to Patent Document 1 is a search device that makes a fuzzy search using a partial character-string in a search term; when a rating thereof is raised as the partial character-string in the search term is contained at a higher rate in a search target character-string, and as the partial character-string is positioned more forward in the search target character-string, an appropriate search result matching a user's sense can be obtained in a facility name search. This uses the following characteristics: generally, when a name is provided in Japanese to a facility and so on, words and phrases to be highlighted tend to be determined to be positioned forward in the name; and usually, the user tends to feel a higher correlativity between the search target character-string and the search term when the search term is positioned forward in the search target character-string rather than when positioned rearward therein.

For example, when a facility name of "ABCD LAND" is inputted as the search term, the search device searches for a search target character-string including "AB", "BC", "CD", "DL", "LA", "AN" and/or "ND" that are its partial character-strings. If two search target character-strings of "ABCD LAND" and "○x BANK ABCD LAND BRANCH" are obtained as this search result, a higher rating is given to "ABCD LAND" which the user is highly likely to desire.

On the other hand, when a search is made for a song title, a facility name and so on, in many cases, a plurality of correlated key words are used as the search key. For example, when the search is made with such a form of "<artist name><song title>" or "<municipal name><facility name>", the search result is further narrowed than when the search is made merely with the song title or facility name, so that acquisition of more appropriate search results can be expected.

An example of a conventional searching technique taking into consideration a relationship between such correlated key words is proposed in Patent Document 2. An invention according to Patent Document 2 is a search device in which facility names and their attendant information are previously associated with each other, and an index for every attendant information is formed, so that a search result is obtained by specifying the attendant information from words and phrases in a search query, followed by browsing the index based on the specified attendant information.

For example, when a search query of "PORK BONE, THIN NOODLE" is inputted, the search device specifies that "PORK BONE" is a key word belonging to the attendant information "TASTE", and then searches for index data of taste previously prepared to thereby acquire the corresponding facility name. Further, the search device specifies that "THIN NOODLE" is a key word belonging to the attendant information "NOODLE", and then searches for index data of noodle previously prepared to thereby acquire the corresponding facility name. Then, the search device combines these searched results and presents a list of the corresponding facility names to the user as the search results.

PRIOR ART DOCUMENTS

Patent Documents

Patent Document 1: Japanese Patent Application Laid-open No. 2003-44515
Patent Document 2: Japanese Patent Application Laid-open No. 2009-211683

SUMMARY OF THE INVENTION

Problems to be Solved by the Invention

However, in the above Patent Document 1, although it is possible to make the fuzzy search taking into consideration the similarity of the character-string, there is a problem such that a search using a mutual relationship between the key words cannot be made even if the search is made with the forms of "<artist name><song title>" and/or "<municipal name><facility name>".

For example, in a case of the music search, when inputted is a search word combining an artist name and a song title mutually related such as "<artist name><song title>", the same rating is provided for the same song title even if the artist name is different, so that the artist name in the search word cannot be reflected in the search result.

In order to reflect the artist name in the search result, it is also possible to generate an index for a search target character-string in which the artist name and the song title are linked with each other; however, the volume of data for the index becomes increased.

Further, if indexes are prepared to correspond to not only the pattern of "<artist name><song title>", but also plural patterns such as "<artist name><album name>" and/or "<album name><song title>", a further enormous volume of data is required, and thus there is a problem such that the above index is unsuited to be used in embedded equipment such as a car navigation apparatus.

On the other hand, in the above Patent Document 2, since the index data is provided for every attendant information, search processing is required for each of the key words such as "PORK-BONE-BROTH" and "NOODLE", and thus there is a problem such that a search-processing time thereof becomes longer.

Further, since when using the fuzzy search at the same time, it is unable to uniquely determine which word in the search query belongs to which attendant information, all the indexes of the attendant information must be searched for all the words in the search query, and thus there is a problem such that the processing cannot be achieved in a practical time in the embedded equipment such as the car navigation apparatus.

Furthermore, using a predefined thesaurus and so on in a conventional search device, a method that makes a search by expanding words in a search query to different related words is employed; however, when a fuzzy search is made after the expansion to the different words, there arises a problem such that the volume of data becomes enormous, similarly to Patent Document 1.

In addition, if the fuzzy search is made possible to the expansion itself to the different words, the number of combinations therefrom becomes enormous, similarly to Patent Document 2, there arises a problem such that the processing cannot be achieved in a practicable time.

The present invention has been made to solve the foregoing problems, and an object of the invention is to provide a search device that makes a flexible fuzzy search using the relationship between the correlated key words while suppressing the data volume for the index.

Means for Solving the Problems

A search device of the present invention includes: a character-string search index in which document data to be searched and partial data by dividing the document data into predetermined units are registered; a relational-data expansion index in which a relationship between the respective document data and a type of the relationship are defined; a character-string search unit that divides a search query into partial data in the predetermined units, and that acquires the document data partially matching the partial data from the character-string search index to calculate a similarity thereof; and a relational-data expansion search unit that acquires document data of an expansion destination defined to have the relationship with respect to the expansion source document data from the relational-data expansion index using the document data acquired by the character-string search unit as an expansion source, and that corrects the similarity of the document data of the expansion source by using a weight according to the type of the relationship and the similarity of the expansion destination document data, and that arranges and outputs the expansion source document data in an order of the corrected similarity.

Effect of the Invention

According to the present invention, when the relational-data expansion index in which the relationship between the respective document data and the type of the relationship are defined is prepared, separately to the character-string search index for making a fuzzy search for the search query, and the similarity is determined taking into consideration the relationship between the respective document data partially matching the search query and the type thereof, it is possible to make a flexible fuzzy search using a relationship between correlated key words while suppressing the data volume of the character-string search index.

BRIEF DESCRIPTION OF THE DRAWINGS

FIG. 4 is a table showing an example of registration data in Embodiment 1.

FIG. 5 is a table showing an example of a relational definition list in Embodiment 1.

FIG. 7 is a table showing a configuration example of a character-string search index in Embodiment 1 when a word-character string is given as a search key.

FIG. 8 is a table showing a configuration example of a character-string search index in Embodiment 1 when a phoneme string is given as the search key.

FIG. 9 is a table showing a configuration example of a character-string search index in Embodiment 1 when a partial character-string is given as the search key.

FIG. 10 is a table showing an example of a relational-data expansion index in Embodiment 1.

FIG. 13 is a table showing an example of relation weight data in Embodiment 1.

FIG. 14 is a table illustrating steps of calculating a relational-data expansion similarity in Embodiment 1, showing a case of a search query "ZYX quartet's blue sky".

FIG. 15 is a table showing an example of a search result in Embodiment 1, showing a case of a search query "ZYX quartet's blue sky".

FIG. 16 is a table showing an example of a character-string search result in Embodiment 1, showing a case of a search query "deep sea in country life" (album name, song title).

FIG. 17 is a table illustrating steps of calculating a relational-data expansion similarity in Embodiment 1, showing a case of a search query "deep sea in country life".

FIG. 18 is a table showing an example of the search result in Embodiment 1, showing the case of the search query "deep sea in country life".

FIG. 19 is a table showing an example of a character-string search result in a search device according to Embodiment 2 of the invention.

FIG. 20 is a table illustrating steps of calculating a relational-data expansion similarity in Embodiment 2, showing a case of "emphasis on relation with artist name".

FIG. 21 is a table showing an example of a search result in Embodiment 2, showing a case of putting "emphasis on relation with artist name".

FIG. 22 is a table showing an example of relation weight data in Embodiment 2, showing a case of "emphasis on relation with album name".

FIG. 23 is a table illustrating steps of calculating a relational data expansion similarity in Embodiment 2, showing a case of putting "emphasis on relation with album name".

FIG. 24 is a table showing an example of the search result in Embodiment 2, showing a case of "emphasis on relation with album name".

BEST MODE FOR CARRYING OUT THE INVENTION

Hereinafter, in order to explain the present invention in more detail, embodiments for carrying out the invention will be described with reference to the accompanying drawings.

Embodiment 1.

Figure 1:
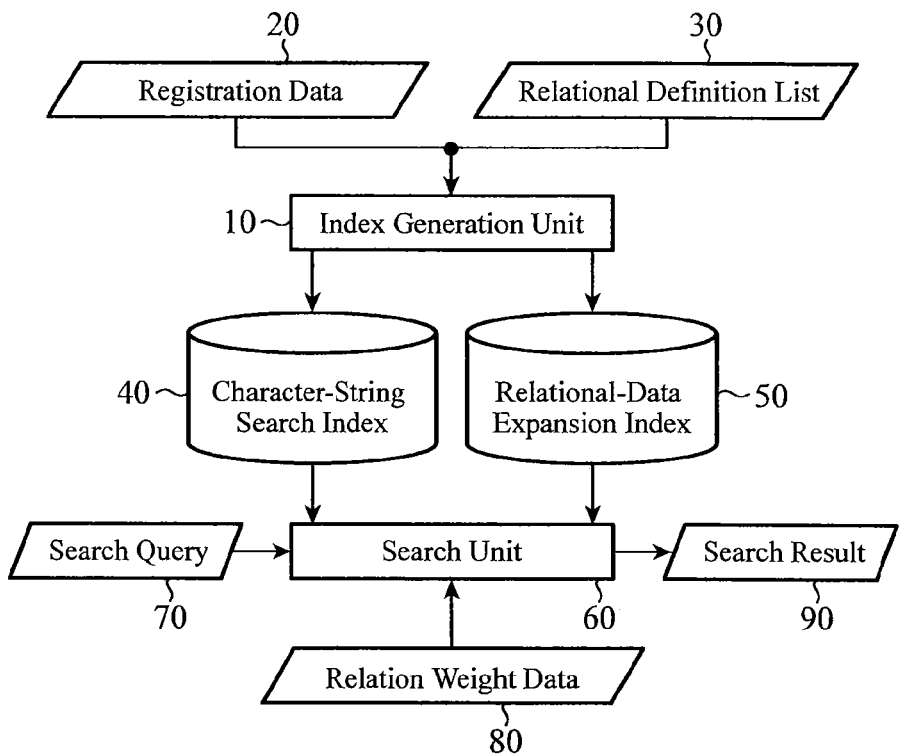
FIG. 1 is a block diagram showing a configuration of a search device according to Embodiment 1 of the present invention.

In the present Embodiment 1, a description is given of a case where a search device shown in FIG. 1 is built in a car navigation apparatus and used for a music search. However, an application of the search device is not limited to the music search of the car navigation apparatus, and it is applicable to general searches on mutually related structural data such as a search for a facility name and an address search.

In FIG. 1, an index generation unit 10 receives registration data 20 and a relational definition list 30, and generates a character-string search index 40 and a relational-data expansion index 50.

Referring to the character-string search index 40 and the relational-data expansion index 50 generated by the index generation unit 10, a search unit 60 searches for data matching a search query 70 inputted by a user, and then outputs a search result 90 to be ranked according to relation weight data 80.

Figure 2:
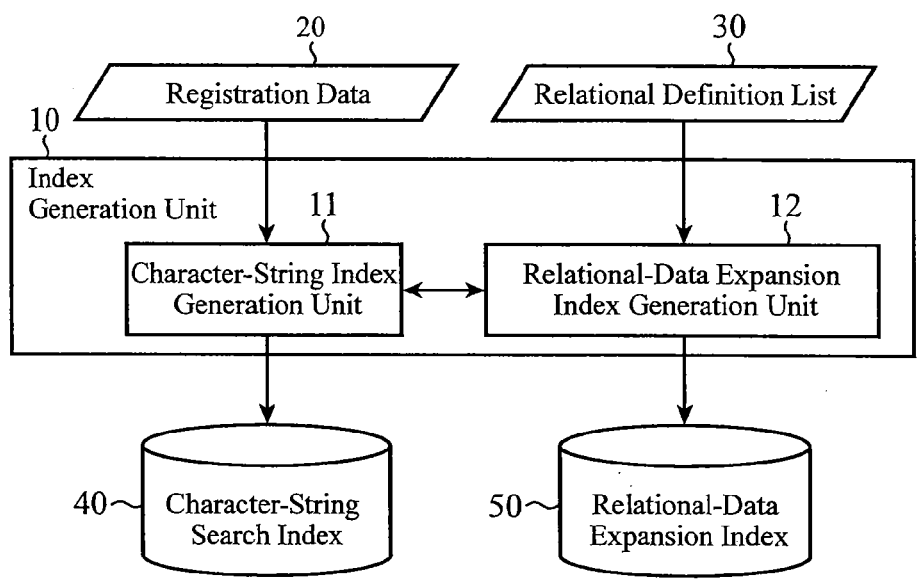
FIG. 2 is a block diagram showing a detailed configuration of an index generation unit in the search device according to Embodiment 1.

In FIG. 2, a detailed configuration of the index generation unit 10 is shown. A character-string index generation unit 11 generates the character-string search index 40 on the basis of document data (caption strings) included in the registration data 20. A relational-data expansion index generation unit 12 generates the relational-data expansion index 50 on the basis of a relational definition list 30 that defines a relationship between the respective document data, and a type of the relationship.

Figure 3:
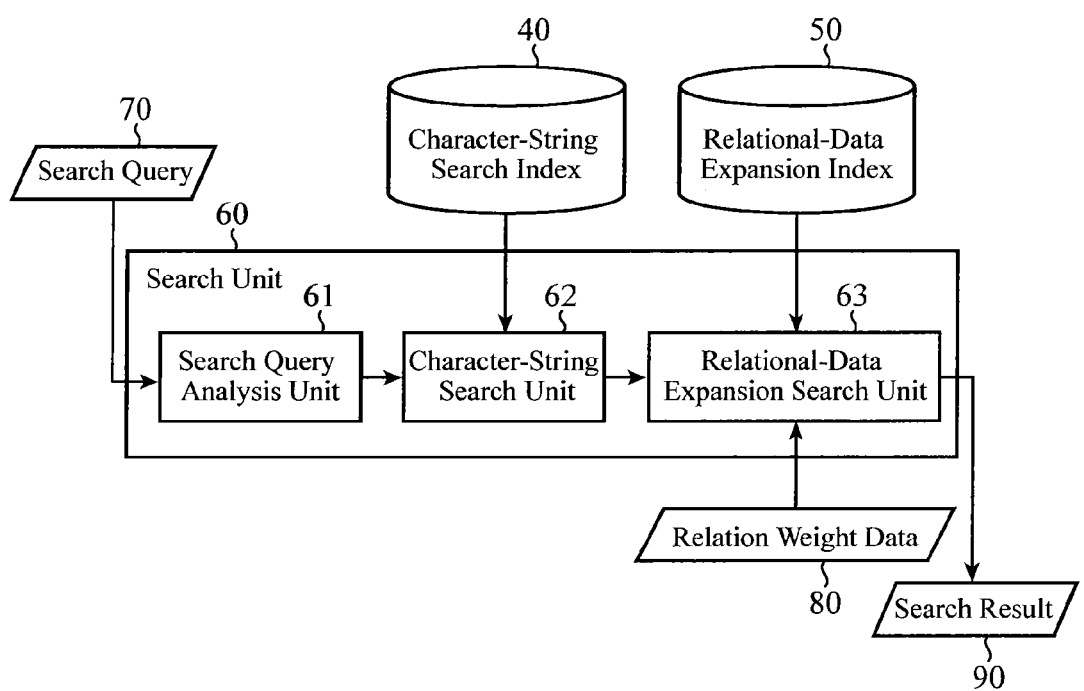
FIG. 3 is a block diagram showing a detailed configuration of a search unit in the search device according to Embodiment 1.

In FIG. 3, a detailed configuration of the search unit 60 is shown. A search query analyzing unit 61 analyzes the search query 70, converts it into partial data for searching the character-string search index 40, and outputs the resultant to a character-string search unit 62. Referring to the character-string search index 40 and using the partial data as a search key, the character-string search unit 62 searches for the document data partially matching the search query 70, calculates a similarity between the partial data and the document data (similarity in character-string), and outputs the resultant to a relational-data expansion search unit 63. The relational-data expansion search unit 63 corrects the similarity by taking into consideration the relationship between the respective document data by referring to the relational-data expansion index 50 and also taking into consideration the type of the relationship in accordance with the relation weight data 80, and then arranges the document data in a descending order of the corrected similarity (relational-data expansion similarity) to thereby establish the search result 90.

FIG. 4 is an example of the registration data 20. The registration data 20 includes at least data of "Document ID (21)", "Caption (22)" and "Data Type (23)". For example, a record of "Document ID (21)"="1" includes data of "Caption (22)"="ABC rock band" and "Data Type (23)"="artist name".

Note that since there are pieces of music having the same name by different artists (for example, "Document ID (21)"="102", "103"), a song title and an album name are the same (for example, "Document ID (21)"="10", "108"), or the like, a plurality of records having the same "Caption (22)" exist.

FIG. 5 is an example of the relational definition list 30. The relational definition list 30 includes at least relational definition data of "Expansion Source Document ID (31)", "Expansion Destination Document ID (32)" and "Relation Type (33)". Here, "Expansion Source Document ID (31)" and "Expansion Destination Document ID (32)" are the data corresponding to "Document ID (21)" shown in FIG. 4. "Relation Type (33)" is information defining a relationship between the respective data of "Data Type (23)" shown in FIG. 4, and in this example, the artist name is associated with the album name, the artist name is associated with the song title, and the album name is associated with the song title. For example, the relational definition data in a first line of the relational definition list 30 defines that there is a relevance between the artist name "ABC rock band" of "Document ID (21)"="1" and the album name "wild country life" of "Document ID (21)"="10".

Next, an operation of the search device will be described. First, index generation processing will be described, followed by search processing.

Figure 6:
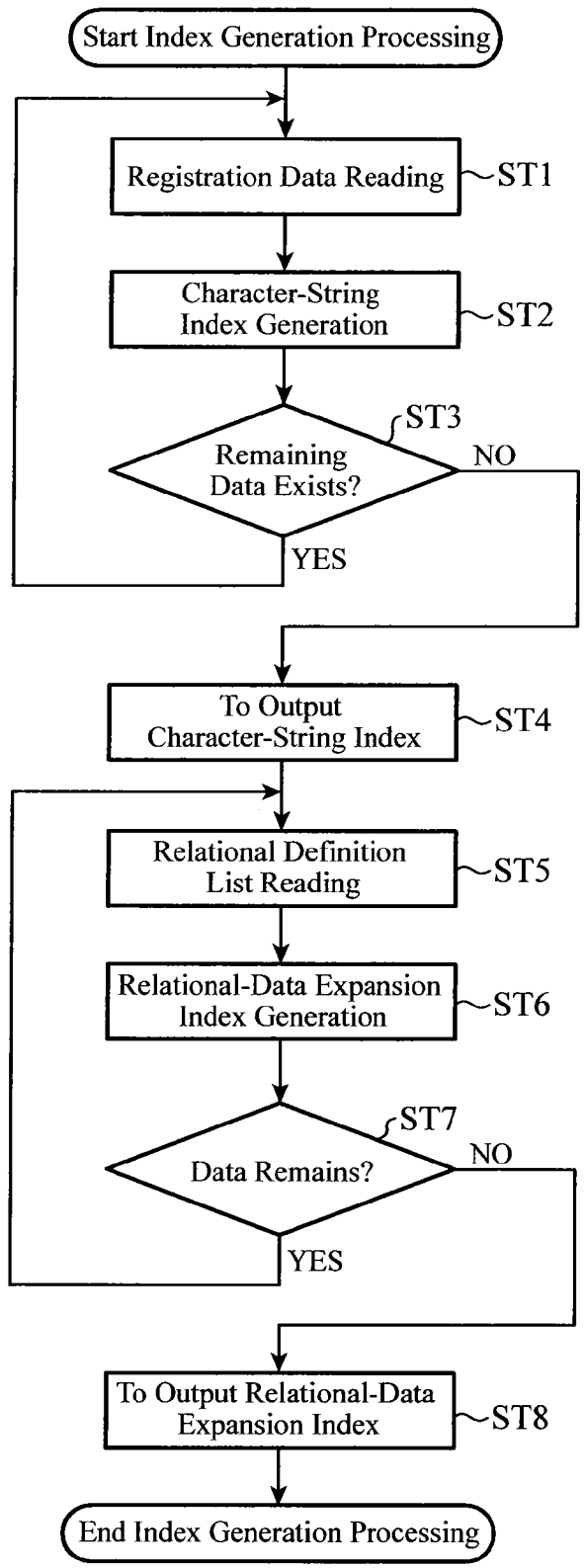
FIG. 6 is a flowchart of index generation processing by the index generation unit in Embodiment 1.

FIG. 6 is a flowchart of the index generation processing by the index generation unit 10.

Step ST1 is a registration-data reading process in which the character-string index generation unit 11 reads the registration data 20 sequentially.

Step ST2 is a character-string index generation process in which the character-string index generation unit 11 generates the character-string search index 40 using a character string of "Caption (22)" in the read-in registration data 20.

For this character-string search index 40, a variety of configuration methods are considered depending on robustness of a fuzzy (ambiguous) search and characteristics of an input device (keyboard input, voice recognition input, character recognition input, and the like). Configuration examples thereof will be described below with reference to FIG. 7 to FIG. 9.

FIG. 7 is a configuration example of the character-string search index 40 when a character-string of word is given as the search key. This character-string search index 40 consists of data of "Word ID (41)", "Word Character-String (42)" and "Document ID Group (43)". For example, with respect to a word of "Word Character-String (42)"="ABC", the record of "Word ID (41)"="1" has registered a group of "Document ID (21)" including "ABC" in "Caption (22)" shown in FIG. 4 as "Document ID Group (43)". Therefore, it is configured such that by using the character-string of word as the search key, the document IDs of all the caption strings including the corresponding word can be obtained.

In the case of this configuration example, it is possible to make a robust search against an abbreviation/omission of words and a change in word order in the search query 70.

Incidentally, an index data structure of the character-string search index 40 and its internal character-string search algorithm are not essential elements in the present invention, and thus their detailed descriptions will be omitted. For example, in order to make a high speed search by a word character-string unit, a publicly known hash method, binary search method or the like may be used.

When the search query 70 is vocally inputted, since a phonological similarity becomes important, a configuration using a phoneme string as the search key is better.

FIG. 8 is a configuration example of the character-string search index 40 when the phoneme string is given as the search key. This character-string search index 40 consists of data of "Word ID (41a)", "Phoneme String (42a)" and "Document ID Group (43a)". For example, with respect to a phoneme string of "Phoneme String (42a)"="ei", the record of "Word ID (41a)"="1" has registered a group of "Document ID (21)" including "ei" in "Caption (22)" shown in FIG. 4 as "Document ID Group (43a)".

Instead, in order to reflect a literal similarity between words, a configuration using a partial character-string as the search key may be employed.

FIG. 9 is a configuration example of the character-string search index 40 when the partial character-string is given as the search key. This character-string search index 40 consists of data of "Word ID (41*b*)", "Partial Character-String (42*b*)" and "Document ID Group (43*b*)". For example, with respect to the partial character-string of "Partial Character-String (42*b*)"="AB", the record of "Word ID (41*b*)"="1" has registered a group of "Document ID (21)" including "AB" in "Caption (22)" shown in FIG. 4 as "Document ID Group (43*b*)".

In the case of this configuration example, it is possible to make a fuzzy search reflecting a literal similarity between words.

In the search device according to the present invention, although any one of the character-string search indexes 40 may be used, a description in the following will be given assuming the case of using the character-string search index 40 in which the word character-string shown in FIG. 7 is given as the search key.

Subsequently, in Step ST3 of FIG. 6, the character-string index generation unit 11 determines whether or not unprocessed data remains in the registration data 20, and if unprocessed data remains (Step ST3 "YES"), then the processes in Steps ST1 and ST2 are repeated. If no unprocessed data remains (Step ST3 "NO"), the flow proceeds to Step ST4, and the character-string search index 40 prepared by the character-string index generation unit 11 is outputted in a form that can be referred in the search processing described later.

Step ST5 is a relational definition list reading process, and the relational-data expansion index generation unit 12 reads sequentially the relational definition list 30.

Step ST6 is a relational-data expansion index generation process, and the relational-data expansion index generation unit 12 generates the relational-data expansion index 50 from the read-in relational definition list 30.

FIG. 10 is an example of the relational-data expansion index 50. This relational-data expansion index 50 is configured such that the corresponding "Expansion destination Document ID (52)" and "Relation Type (53)" can be acquired (retrieved) using "Expansion Source Document ID (51)" as the search key.

Incidentally, an index data structure of the relational-data expansion index 50 and its internal search algorithm are not essential elements of the present invention, and thus their detailed description will be omitted. For example, by using the publicly known hash method, it is contemplated that the relational definition data are acquirable at a high speed using "Expansion Source Document ID (51)" as a hash key.

Subsequently, in Step ST7 of FIG. 6, the relational-data expansion index generation unit 12 determines whether or not unprocessed data remains in the relational definition list 30, and if unprocessed data remains (Step ST7 "YES"), then the processes in Steps ST5 and ST6 are repeated. If no unprocessed data remains (Step ST7 "NO"), the flow proceeds to Step ST8, and the relational-data expansion index 50 prepared by the relational-data expansion index generation unit 12 is outputted in a form that can be referred in the search processing described later.

The foregoing is the index generation processing. Successively, the search processing will be described below.

Figures 11, 12:
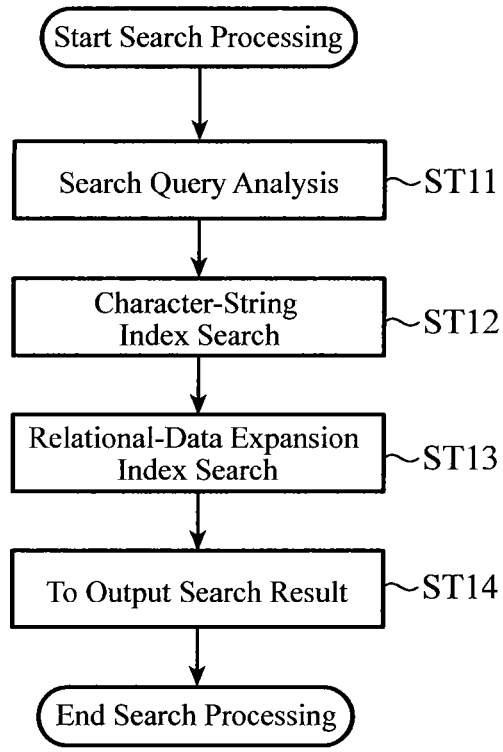
FIG. 11 is a flowchart of search processing by the search unit in Embodiment 1.
FIG. 12 is a table showing an example of a character-string search result in Embodiment 1 when a search query is "ZYX quartet's blue sky" (artist name, song title).

FIG. 11 is a flowchart of the search processing by the search unit 60.

(1) SEARCH PROCESSING EXAMPLE 1

In this example, a description will be given of a case where a pattern of the search query of "<artist name><song title>" is processed, and it is assumed that "ZYX quartet's blue sky" is inputted as the search query 70 and that "song title" is designated as a search target.

Step ST11 is an analyzing process of the search query, and the search query analyzing unit 61 analyzes a character-string of the search query 70 and divides it into word units. In this example, a search query character-string of "ZYX quartet's blue sky" is divided into the word units to provide four words of "ZYX", "quartet's", "blue" and "sky". These words are output as a search query analysis result to the character-string search unit 62.

Step ST12 is a search process of the character-string index, and the character-string search unit 62 acquires a search result corresponding to the search query analysis result by referring to the character-string search index 40. When the character-string search index 40 has a configuration shown in FIG. 7, each "Document ID Group (43)" of "Word ID (41)"="25", "6", and "20" corresponding to three words of "ZYX", "blue", and "sky", respectively, is acquired. On the other hand, a word character-string corresponding to "quartet's" is not found in the character-string search index 40, so that no "Document ID Group (43)" thereof exists.

Then, the character-string search unit 62 adds a character-string similarity to each Document ID included in the acquired "Document ID Group (43)", and outputs the resultant as a character-string search result to the relational-data expansion search unit 63.

When the character-string similarity is added thereto, it is also possible to use a tf•idf weight (Term Frequency-Inverse Document Frequency weight) or the like taking into consideration importance of words; however, for the sake of simplifying herein the description, the description will be given assuming that all the words equally have a weight of "1".

FIG. 12 is an example of a character-string search result showing a relation between Document IDs and character-string similarities, and is a result with respect to a search query character-string of "ZYX quartet's blue sky". When the weight of "1" is provided for the word, "clear blue sky" of "Document ID"="102", for example, results in "Character-String Similarity"="2", since it includes two words of "blue" and "sky".

On the other hand, "ZYX quartet" of "Document ID"="2" results in "Character-String Similarity"="1", since it includes a word of "ZYX". In the present Embodiment 1, since the description is given to the example of using the character-string search index 40 in which the word character-string as shown in FIG. 7 is used as the search key, and thus "quartet's" in the search query 70 and "quartet" of "Word Character-String (42)" are determined to be mismatched with each other, so that a character-string similarity corresponding to this mismatch is not added thereto.

In contrast, in the case of using the character-string search index 40 as shown in FIG. 9 in which a partial character-string is given as the search key, since a word "quartet" included in a caption "ZYX quartet" of "Document ID"="2" and "quartet's" in the search query 70 are highly similar in character-string to each other, each "Document ID Group (43*b*)" of "Partial Character-String (42*b*)" corresponding to "quartet's" is acquired, and as a result, "Character-String Similarity" of "Document ID"="2" becomes higher than a value shown in FIG. 12, so that more suitable search results are obtained.

Meanwhile, when a voice recognition result is given as the search query 70, by using the character-string search index 40 as shown in FIG. 8 in which each phoneme string is given as the search key, a search result that is robust against a recognition error is obtained. For example, even if the word of "ZYX" is erroneously voice-recognized as "Z why X", "ZYX" and "Z why X" are similar to each other as the phoneme string; thus, "Document ID Group (43a)" that is similar in Document IDs included therein is acquired, so that a suitable search result is obtained.

Step ST13 of FIG. 11 is a relational-data expansion index search process, and by using "Document ID" (FIG. 12) in the character-string search result as the search key, the relational-data expansion search unit 63 refers to the relational-data expansion index 50 shown in FIG. 10 to thereby acquire "Expansion destination ID (52)" and "Relation Type (53)". Also, by using the acquired "Relation type (53)" as the search key, the relational-data expansion search unit 63 refers to the relation weight data 80, acquires a relation weight according to the relation type, and calculates a relational-data expansion similarity.

FIG. 13 is an example of the relation weight data 80. The relation weight data 80 defines "Relation Weight (82)" with respect to "Relation Type (81)".

FIG. 14 is a table illustrating steps of calculating the relational-data expansion similarity on the basis of the character-string search result shown in FIG. 12.

By using "Document ID"="2" shown in FIG. 12 as the search key, the relational-data expansion search unit 63 acquires from the relational-data expansion index 50 shown in FIG. 10 the following three relational data: "Expansion Destination Document ID (52)"="30" and "Relation Type (53)"="artist name→album name"; "Expansion Destination Document ID (52)"="103" and "Relation Type (53)"="artist name→song title"; and "Expansion Destination Document ID (52)"="110" and "Relation Type (53)"="artist name→song title".

Of these, the two of "Expansion Destination Document IDs (52)"="30" and "110" are absent in "Document ID" in the character-string search result shown in FIG. 12, and thus the calculation therefor is performed by setting the "Character-String Similarity" to "0" as shown in FIG. 14. In contrast, the calculation for "Expansion Destination Document ID (52)"="103" is performed by using "Character-String Similarity"="2" shown in FIG. 12.

In addition, the relational-data expansion search unit 63 acquires from the relation weight data 80 shown in FIG. 13 each relation weight defined with respect to "Relation Type (53)" of each relational data. "Relation Weight (82)"="0.3" is given to "Expansion destination Document ID (52)"="30" with the relation type of "artist name album name".

Further, the relational-data expansion search unit 63 adds a value multiplying "Character-String Similarity" of "Expansion Source Document ID (51)" by "Relation Weight (82)" to "Character-String Similarity" of "Expansion destination Document ID (52)" to thereby determine "Relational-Data Expansion Similarity". For example, regarding relational data of "Document ID"="103" shown in a fifth line of FIG. 14, "Relational-Data Expansion Similarity"=2.2 is given thereto, because "Character-String Similarity"="1" is given to "Expansion Source Document ID (51)"="2"; "Relation Weight (82)"="0.2" is given to "artist name, song title"; and "Character-String Similarity"="2" is given to "Expansion destination Document ID (52)"="103". Also regarding relational data of "Document IDs"="30" and "110", a similar calculation is performed to thereby obtain "Relational-Data Expansion Similarities"=0.3 and 0.2.

Step ST14 in FIG. 11 is a search result output process, and the relational-data expansion search unit 63 arranges the calculation results of the relational-data expansion similarity shown in FIG. 14 in the order of "Relational-Data Expansion Similarities", and then outputs, as the search result 90, the resultant in a manner limited to only "song titles" designated as a search target. FIG. 15 is an example of the search result 90.

It is noted that as a method of limiting to the types of the "song titles" and so on designated as the search target, it is exemplified as follows: the registration data 20 (the contents shown in FIG. 4) have been stored in a memory device in the search device, and the relational-data expansion search unit 63 refers to this registration data 20 to thereby select only the "Document ID (21)" whose "Data Type (23)" becomes the "song title".

As described above, based on the relational definition list 30 provided in advance and the relation weight data 80, the search unit 60 can make the search and ranking taking into consideration a relation between the respective search target data, for example, between an artist name and a song title in a music search, while making the fuzzy search for the character-string of the search query 70.

In the above example, with respect to the same song title "clear blue sky" by the artists of "ABC rock band" and "ZYX quartet", since the word "ZYX" that is a part of the artist name is included in the search query 70, it is possible to output the piece of music "clear blue sky" by the artist "ZYX quartet" to be ranked higher as shown in FIG. 15.

(2) Search Processing Example 2

In the above example, a description is given to the case where the search processing is performed with the pattern of the search query of "<artist name><song title>"; however, the search device according to the present Embodiment 1 can perform search processing with a search query having another pattern without changing the configuration of the indexes.

In the following, a description will be given to a case where a pattern of a search query of "<album name><song title>" is processed. In this case, it is assumed that "deep sea in country life" is inputted as the search query 70 and "song title" is designated as a search target.

Further, even when the search query of this pattern is processed, the search unit 60 uses the character-string search index 40 and the relational-data expansion index 50 that are generated by the index generation unit 10 on the basis of the previous registration data 20 and relational definition list 30.

In Step ST11 of FIG. 11, the search query analyzing unit 61 analyzes the character-string "deep sea in country life" of the search query 70, divides it into word units, and outputs five words of "deep", "sea", "in", "country" and "life".

In Step ST12, the character-string search unit 62 acquires "Document ID Group (43)" corresponding to each word in the search query analysis result by referring to the character-string search index 40. When the character-string search index 40 in which each word character-string is given as the search key as shown in FIG. 7 is used, each "Document ID Group (43)" of "Word ID (41)"="11", "19", "10" and "13" corresponding to the four words of "deep", "sea", "country" and "life", respectively, is acquired. On the other hand, the word character-string corresponding to "in" is not found in the character-string search index 40, so that no "Document ID Group (43)" thereof exists.

Then, the character-string search unit 62 adds a character-string similarity to each Document ID in the acquired "Document ID Groups (43)", that is, in "Document ID Group (43)"="105, 106" corresponding to "deep", in "Document ID Group (43)"="105, 106" corresponding to "sea", in "Document ID Group (43)"="10, 108" corresponding to "country", and in "Document ID Group (43)" ="10, 108" corresponding to "life".

With respect to the search query character-string of "deep sea in country life", a character-string search result shown in FIG. 16 is obtained. In this case, when the character-string similarity is added thereto, all the words are set to equally have a weight of "1".

In Step ST13, the relational-data expansion search unit 63 refers, using each "Document ID" (FIG. 16) in the character-string search result as the search key, to the relational-data expansion index 50 shown in FIG. 10 to thereby acquire "Expansion destination ID (52)" and "Relation Type (53)", and also refers, using this "Relation Type (53)" as the search key, to the relation weight data 80 shown in FIG. 13 to thereby acquire "Relation Weight (82)", and then calculates the relational-data expansion similarity using them.

FIG. 17 is a table illustrating steps of calculating the relational-data expansion similarity with respect to the search query character-string of "deep sea in country life" on the basis of the character-string search result shown in FIG. 16.

By using "Document ID"="10" shown in FIG. 16 as the search key, the relational-data expansion search unit 63 acquires from the relational-data expansion index 50 shown in FIG. 10 one relational data of "Expansion destination Document ID (52)"="106" and "Relation Type (53)"="album name→song title". Further, the relational-data expansion search unit 63 acquires from the relation weight data 80 shown in FIG. 13 "Relation Weight (82)"="0.1" defined for "Relation Type (53)" of the relational data. Then, the relational-data expansion search unit 63 adds a value multiplying "Character-String Similarity"="2" of "Expansion Source Document ID (51)" by "Relation Weight (82)"="0.1" to "Character-String Similarity"="2" of "Expansion destination Document ID (52)" to thereby obtain "Relational-Data Expansion Similarity"=2.2.

In Step ST14, the relational-data expansion search unit 63 arranges the calculation result of the relational-data expansion similarities shown in FIG. 17 in an order of "Relational-Data Expansion Similarities" to be thus limited to only the "song titles" designated as a search target, and then outputs the resultant as a search result 90 shown in FIG. 18.

As described above, based on the relational definition list 30 provided in advance and the relation weight data 80, it becomes possible for the search unit 60 to make the search and ranking taking into consideration the relation between the respective search target data, for example, between an album name and a song title in the music search, while making the fuzzy search for the character-string of the search query 70.

In the above example, with respect to the same song title "deep blue sea" in the albums of "wild country life" and "cold mountain", since the word "country life" that is a part of the album name is included in the search query 70, it is possible to output the piece of music "deep blue sea" in the album of "wild country life" to be ranked higher.

Further, it is possible to deal with both of the pattern of the search query of "<artist name><song title>" and the pattern of the search query of "<album name><song title>" without changing each configuration of the character-string search index 40 and the relational-data expansion index 50. This provides such an advantage that, for various patterns of the search query, it is unnecessary to generate individual character-string search indexes 40 corresponding to the patterns, so that the volume of data can be reduced.

From the above, according to Embodiment 1, the search device is configured to include: the character-string search index 40 in which the registration data 20 to be searched and word character-strings obtained by dividing the registration data 20 into the word units are registered; the relational-data expansion index 50 in which the relationship between the respective registration data 20, and the type of the relationship are defined; the search query analyzing unit 61 that divides the search query 70 into the word units; the character-string search unit 62 that acquires the registration data 20 including a word character-string partially matching the divided words from the character-string search index 40 and that calculates the character-string similarity; and the relational-data expansion search unit 63 that uses the registration data 20 acquired by the character-string search unit 62 as the expansion source document data, and that acquires the expansion destination document data defined to have the relationship with respect to the expansion source document data from the relational-data expansion index 50, and that corrects the character-string similarity of the expansion source document data using a relation weight according to the type of the relationship that is set in the relation weight data 80 and the character-string similarity of the expansion destination document data to thus calculate the relational-data expansion similarity, and that outputs the search result 90 that arranges the expansion source document data in the order of the relational-data expansion similarity. Therefore, it becomes possible to determine the similarity taking account of the relationship between the respective document data partially matching the search query 70 and the type thereof by using the relational-data expansion index 50, so that the flexible fuzzy search using the relationship between the correlated key words can be carried out. Further, since the relational-data expansion index 50 is provided separately from the character-string search index 40, it is not required to generate individual character-string search indexes 40 corresponding to the respective patterns of the search query 70, thereby suppressing the volume of data.

Further, when the character-string search index 40 configured by the word character-strings 42 where the registration data 20 to be searched is divided into the word units is used, it is possible to make the robust search against the abbreviation/omission of the word and the change in word order.

Meanwhile, according to Embodiment 1, the search device can also use the character-string search index 40 that is configured by the partial character-strings 42b where the registration data 20 to be searched is divided into units of an arbitrary number of character strings; in this case, it becomes possible to make a fuzzy search reflecting a literal similarity of words.

Further, according to Embodiment 1, the search device can also use the character-string search index 40 that is configured by the phoneme strings 42a where the registration data 20 to be searched is divided into units of an arbitrary number of phoneme strings; in this case, it becomes possible to make a fuzzy search reflecting a phonological similarity. Thus, it is possible to make a robust search against a voice recognition error.

Further, according to Embodiment 1, the search device is configured to include: the character-string index generation unit 11 that generates the character-string search index 40 by dividing the registration data 20 to be searched into predetermined units such as the word units; and the relational-data expansion index generation unit 12 that generates the relational-data expansion index 50 on the basis of the relational definition list 30 in which the relationship between the respective registration data 20 and the type of the relationship are defined. For this reason, it is unnecessary to generate individual character-string search indexes 40 corresponding to the respective patterns of the search query 70, so that the volume of data can be suppressed.

Embodiment 2

A search device of the present Embodiment 2 has a configuration on the drawing similar to that of the search device shown in FIG. 1 to FIG. 3, and uses without changing the registration data 20, the relational definition list 30, the character-string search index 40 and the relational-data expansion index 50; thus, in the following, a description will be given citing FIG. 1 through FIG. 11 and FIG. 13.

When making a search by changing the value of the relation weight data 80, a search unit 60 of the present Embodiment 2 calculates a relational-data expansion similarity according to a situation in the search.

In the following, it is assumed that "bad brothers wild wind" is inputted as a search query 70, and that "song title" is designated as a search target. Then, with respect to this instance, a description will be given to a case of making a search with a relation weight data of "emphasis on relation with artist name", and a case of making a search with a relation weight data of "emphasis on relation with album name".

(1) Search Processing Example 1

First, a description is given to the case of making the search with the relation weight data of "emphasis on relation with artist name".

In Step ST11 of FIG. 11, a search query analyzing unit 61 analyzes the character-string "bad brothers wild wind" of the search query 70, divides it into word units, and outputs four words of "bad", "brothers", "wild" and "wind".

In Step ST12, a character-string search unit 62 acquires "Document ID Group (43)" corresponding to each word in a search query analysis result by referring to the character-string search index 40. When the character-string search index 40 in which a word character-string as shown in FIG. 7 is given as a search key is used, each "Document ID Group (43)" of "Word ID (41)"="2", "7", "23" and "24" corresponding to the four words of "bad", "brothers", "wild" and "wind", respectively, is obtained.

Then, the character-string search unit 62 adds a character-string similarity to each Document ID in "Document ID Group (43)"="3, 30" corresponding to "bad", in "Document ID Group (43)"="3, 30" corresponding to "brothers", in "Document ID Group (43)"="10, 108, 110, 111" corresponding to "wild", and in "Document ID Group (43)"="110, 111" corresponding to "wind".

With respect to the search query character-string of "bad brothers wild wind", a character-string search result shown in FIG. 19 is obtained. When the character-string similarity is added thereto, all the words are set to equally have a weight of "1", similarly to the above Embodiment 1.

In Step ST13, using the relation weight data 80, a relational-data expansion search unit 63 calculates a relational-data expansion similarity of the character-string search result.

Here, according to the relation weight data 80 shown in FIG. 13, "Relation Weight (82)"="0.2" for "artist name→song title" is set in a larger value than "Relation Weight (82)"="0.1" for "album name→song title", so that a setting of "emphasis on relation with artist name" is provided.

Accordingly, in this example, the relational-data expansion search unit 63 refers, using "Document ID" (FIG. 19) in the character-string search result as the search key, to the relational-data expansion index 50 shown in FIG. 10 to thereby acquire "Expansion destination ID (52)" and "Relation Type (53)", and also refers, using this "Relation Type (53)" as the search key, to the relation weight data 80 shown in FIG. 13 to thereby acquire "Relation Weight (82)", and then calculates the relational-data expansion similarity using them.

FIG. 20 is a table illustrating steps of calculating the relational-data expansion similarity with respect to the search query character-string of "bad brothers wild wind" on the basis of the character-string search result shown in FIG. 19, showing a case of "emphasis on relation with artist name".

In this example, the following Document IDs are obtained: specifically, four relational-data of "Expansion Source ID (51)"="3" ("Document ID"="20", "104", "105", "111"); two relational-data of "Expansion Source ID (51)"="30" ("Document ID" ="108", "110"); and one relational-data of "Expansion Source ID (51)"="10" ("Document ID"="106"). Of these, the respective relational-data of "Document ID"="20", "104", "105", "106" are absent in the character-string search result, so that the calculation is performed by setting "Character-String Similarity" to zero.

Similarly to the above Embodiment 1, with respect to the relational data, the relational-data expansion search unit 63 adds a value multiplying "Character-String Similarity" of "Expansion Source Document ID (51)" by "Relation Weight (82)" defined in the relation weight data 80 to "Character-String Similarity" of "Expansion destination Document ID (52)" to thereby determine the relational-data expansion similarity.

In Step ST14, the relational-data expansion search unit 63 arranges the calculation result of the relational-data expansion similarity shown in FIG. 20 in the order of "Relational-Data Expansion Similarity" to be thus limited to only a "song title" designated as a search target, and outputs the resultant as a search result 90 as shown in FIG. 21.

(2) Search Processing Example 2

Next, although "bad brothers wild wind" that is the same as the above is inputted as the search query 70, a description is given to a case where the search is made with the relation weight data of "emphasis on relation with album name". In this case, processes in Steps ST11 and ST12 are similar to the above.

In FIG. 22, an example of the relation weight data 80 of "emphasis on relation with album name" is shown. In the relation weight data 80, "Relation Weight (82a)"="0.2" for "album name→song title" is set in a larger value than "Relation Weight (82a)" ="0.1" for "artist name→song title", so that a setting of "emphasis on relation with album name" is provided.

In Step 13, the relational-data expansion search unit 63 refers, using the "Document ID" (FIG. 19) in the character-string search result as the search key, to the relational-data expansion index 50 shown in FIG. 10 to thereby acquire "Expansion destination ID (52)" and "Relation Type (53)", and also refers, using this "Relation Type (53)" as the search key, to the relation weight data 80 shown in FIG. 22 to thereby acquire "Relation Weight (82a)", and then calculates the relational-data expansion similarity using them.

FIG. 23 is a table illustrating steps of calculating the relational-data expansion similarity with respect to the search query character-string of "bad brothers wild wind" on the basis of the character-string search result shown in FIG. 19, showing a case of "emphasis on relation with album name". Further, FIG. 24 is a search result 90.

For example, for the relational-data of "Document ID"="111" with "artist name→song title", in the case of "emphasis on relation with artist name", "Relational-Data Expansion Similarity"=2.4 is given using "Relation Weight (82)"="0.2" (FIG. 20), whereas in the case of "emphasis on relation with album name", "Relational-Data Expansion Similarity"=2.2 is given using "Relation Weight (82)"="0.1" (FIG. 23). Accordingly, "wild is the wind" of "Document ID"="111" is ranked first in the search result emphasizing relation with artist name (FIG. 21), but is ranked second in the search result emphasizing relation with album name (FIG. 24).

In contrast, the relational-data of "Document ID"="110" with "album name→song title" is ranked second in the case of emphasizing relation with artist name (FIG. 21), but is ranked first in the case of emphasizing relation with album name (FIG. 24).

As described above, based on the relational definition list 30 provided in advance and the relation weight data 80 given at the time of search, the search unit 60 can make a search and ranking taking into consideration a relation between respective search target data, for example, between an artist name and a song title in a music search, while making a fuzzy search for the character-string of the search query 70.

Further, when the search is made by changing the value of the relation weight data 80, there is obtained a search result complied with a situation and purpose at the time of search.

For example, on an application for inputting the search query 70, in a case where a selection is made from menus of "Precedence to relation with artist name", "Precedence to relation with album name" and the like, when the relational-data expansion search unit 63 makes a search by changing the relation weight data 80 in FIG. 13, FIG. 22, and so on, it can be adapted such that the search result 90 according to a user's purpose is obtained.

Further, for example, in a case where a search is made by a voice input, when the relational-data expansion search unit 63 makes the search by using differently the relation weight data 80 shown in FIG. 13 and FIG. 22 for a case where a voice input device requires a voice input of the user with a prompt of "Please input an artist name and a song title", and a case where the device requires the voice input of the user with a prompt of "Please input an album name and a song title", it is possible to obtain the search result complied with the situation and purpose at the time of search.

From the above, according to Embodiment 2, it is configured such that the relational-data expansion search unit 63 changes the relation weight data 80 according to an external input designating a type of a relationship to be prioritized, and that the relational-data expansion similarity of the expansion source document data corresponding to the prioritized relationship type becomes larger. For this reason, in addition to the effects in the above Embodiment 1, it is possible to obtain the search result complied with the situation and purpose at the time of search.

It is noted that in the present invention, it is possible to freely combine the embodiments, modify any component of the embodiments, or omit any component in the embodiments within the scope of the invention.

INDUSTRIAL APPLICABILITY

As described above, according to the search device of the present invention, since it is configured such that a flexible fuzzy search is made executable to mutually related structural data while suppressing the volume of data, it is suitable for use in a car navigation apparatus, a smartphone and/or the like that perform a music search, a facility name search, an address search and/or the like.

DESCRIPTION OF REFERENCE NUMERALS AND SIGNS

10: index generation unit, 11: character-string index generation unit, 12: relational-data expansion index generation unit, 20: registration data, 30: relational definition list, 40: character-string search index, 50: relational-data expansion index, 60: search unit, 61: search query analyzing unit, 62: character-string search unit, 63: relational-data expansion search unit, 70: search query, 80: relation weight data, 90: search result.

The invention claimed is:

1. A search device comprising:
    a character-string search index configured to register document data to be searched by dividing the document data into predetermined units;
    a relational-data expansion index configured to define a relationship between the respective document data and further define a type of the relationship;
    a character-string search unit configured to
        divide a search query into partial data in the predetermined units,
        acquire document data partially matching the partial data from the character-string search index, and
        calculate a similarity between the partial data and the respective document data; and
    a relational-data expansion search unit configured to
        acquire, from the relational-data expansion index, relational definition data of an expansion source document and an expansion destination document, and a relationship indicator corresponding to a type of relationship between the expansion source document and the expansion destination document, correct the similarity based on the relational definition data and a weighted factor associated with the relationship indicator, and
        arrange and output the expansion source document data in an order of the corrected similarity.

2. The search device according to claim 1, wherein:
    the character-string search index has partial data in which the document data to be searched is divided into word units, and
    the character-string search unit searches the character-string search index using a word that is a part of the search query as a search key.

3. The search device according to claim 1, wherein:
    the character-string search index has partial data in which the document data to be searched is divided into units of an arbitrary number of characters, and
    the character-string search unit searches the character-string search index using a character string having the arbitrary number of characters of the search query as a search key.

4. The search device according to claim 1, wherein:
    the character-string search index has partial data in which the document data to be searched is divided into units of an arbitrary number of phonemes, and
    the character-string search unit searches the character-string search index using a phoneme string having the arbitrary number of phonemes of the search query as a search key.

5. The search device according to claim 1, wherein:
    the relational-data expansion search unit increases the weighted factor according to an external input designating the type of the relationship to be prioritized, such that the similarity of the document data between the expansion source document and the expansion destination document to which the type of the relationship is defined becomes larger.

6. The search device according to claim 1, further comprising:
a character-string index generation unit that generates the character-string search index by dividing the document data to be searched into partial data of the predetermined units; and
a relational-data expansion index generation unit that generates the relational-data expansion index on the basis of a relational definition list that includes the relational definition data associated with the expansion source document and the expansion destination document and further includes the relationship indicator.

7. The search device according to claim 1, wherein the character-string search unit is further configured to:
list, in a document identification group index, each document in which the partial data from the character-string search index is found.

* * * * *